Dec. 9, 1969
H. PYPTIUK
3,482,804
JET-PROPELLED AEROPLANES
Filed July 19, 1967
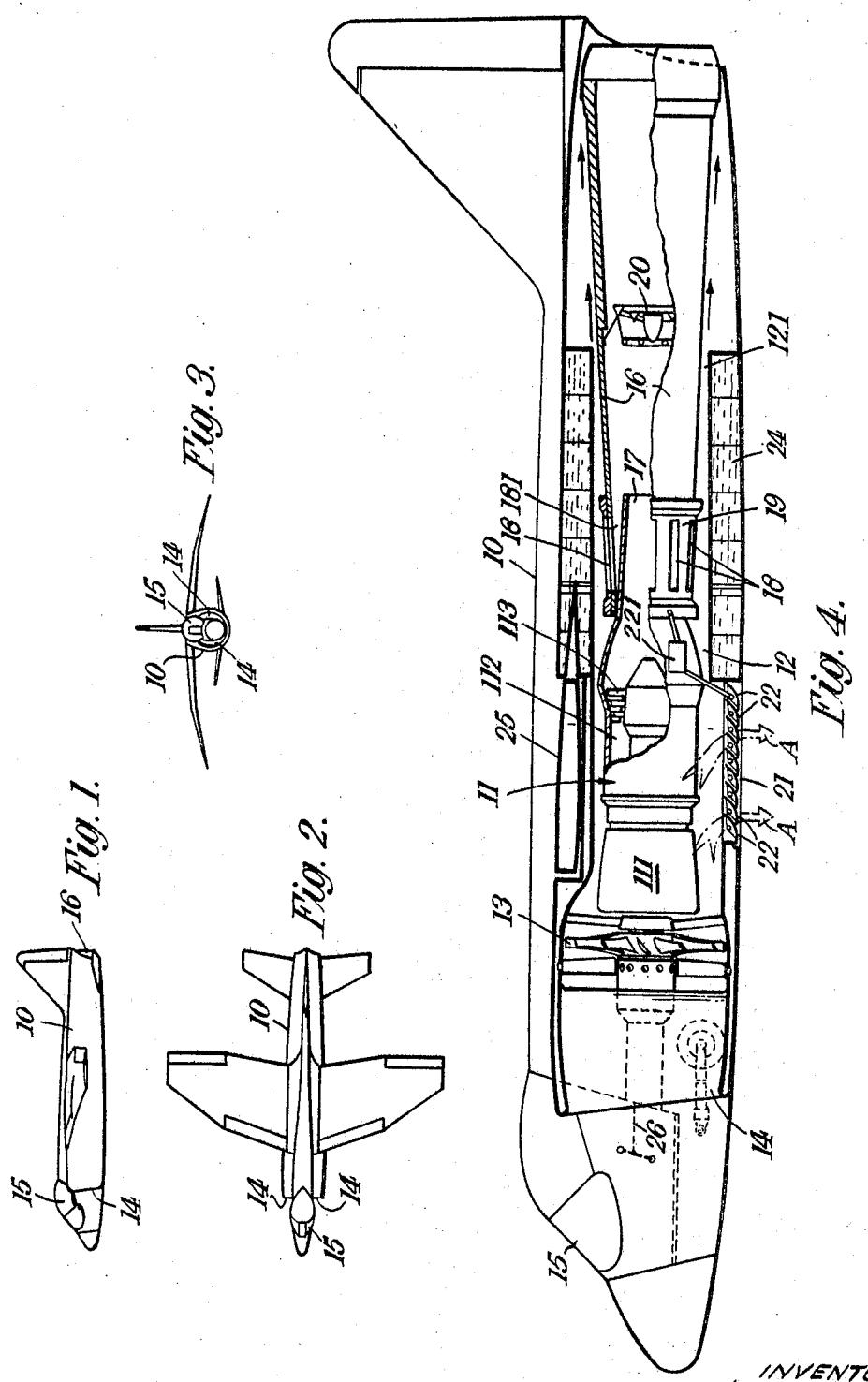
INVENTOR
HENRYK PYPTIUK
BY
Nolte & Nolte
ATTORNEYS

United States Patent Office 3,482,804
Patented Dec. 9, 1969

3,482,804
JET-PROPELLED AEROPLANES
Henryk Pyptiuk, Preston, England, assignor to British Aircraft Corporation (Operating) Limited, London, England, a British company
Filed July 19, 1967, Ser. No. 654,427
Claims priority, application Great Britain, July 27, 1966, 33,813/66
Int. Cl. B64d 27/16, 33/04
U.S. Cl. 244—53          6 Claims

ABSTRACT OF THE DISCLOSURE

A jet-propelled aeroplane with short take-off and landing characteristics and capable of unusually low flying speeds, having a by-pass or turbo-fan engine and a divergent jet pipe. A valve aperture connects the jet pipe to the by-pass duct and a second valve aperture in the by-pass duct leads to a downwardly directed orifice for vertical lift. The valves are connected so that for low speed flight the by-pass air is directed through the downwardly directed orifice and the partly filled divergent jet pipe acts as an air brake, while for normal flight the first valve is opened and the second is closed so that the by-pass air is directed into the jet pipe which consequently runs full.

---

This invention relates to jet-propelled aeroplanes and has the object of providing an improved form of jet-propelled aeroplane, which will possess short take-off and landing characteristics and a capacity for operation at unusually low flying speeds, whilst being capable of maintained rapid acceleration to high subsonic speeds.

According to the invention the aeroplane is provided with a gas turbine power plant of the kind in which a portion of the air compressed therein by-passes the usual combustion zone and turbine through a duct which surrounds the power plant, a divergent jet efflux pipe, a valved aperture in the jet-pipe connecting its interior with the by-pass duct, a second valved aperture in the by-pass duct with a downwardly directed orifice, and means for simultaneously closing the first valved aperture and opening the second valved aperture so that lift is obtained from the by-pass air passing out of the downwardly directed orifice while the divergent jet pipe is only partly filled and acts as an air brake, for low-speed flight, take-off or landing, and for simultaneously opening the first valved aperture and closing the second valved aperture so that the jet pipe can run full for other flight conditions.

The power plant is a turbo-fan engine, comprising a turbo-jet engine and a compressor fan driven thereby, and the compressor fan preferably has variable-pitch blades.

The arrangement of the valved apertures and the divergent jet pipe has the result that, in very slow speed flight, when the by-pass air is expelled downwards through the second aperture, the jet pipe is only carrying the exhaust from the turbo-jet engine for propulsive thrust. The jet pipe is consequently only partly filled and therefore forms an effective air brake. When the first aperture is open and the second is closed, by-pass air flows into and fills the jet pipe producing full forward thrust and thereby removing the cause of high drag.

The accompanying diagrammatic drawings illustrate the manner in which the invention may be carried into effect in a single-engined aircraft having the power plant housed in the fuselage. It will however be understood that the invention is also applicable to a multi-engined aeroplane having the power-plants housed in the fuselage or elsewhere.

In said drawings:
FIG. 1 is a side elevation,
FIG. 2 is a plan,
FIG. 3 is a front view of an aeroplane in accordance with the invention, and
FIG. 4 is drawn to a larger scale, showing a side view of the aircraft in longitudinal section.

The aeroplane has a fuselage 10 with a single gas turbine power plant of the turbo-fan type, incorporating a turbo-jet engine 11 comprising a compressor 111, combustion chambers 112 and turbine 113, mounted within a by-pass duct 12. The power plant also incorporates a variable blade pitch compressor fan 13 driven from the turbine 113 and mounted upstream of the compressor 111 within the duct 12. Air for the engine 11 and the fan 13 is drawn from intakes 14 on either side of the cockpit 15. At the rear the turbo-jet engine 11 is connected to a divergent jet pipe 16, into which extends the convergent nozzle 17 of the engine. A series of apertures 18 in the form of longitudinal slots allow communication between the by-pass duct 12 and the interior of the jet pipe 16, these apertures opening into the divergent double-conical space 181 between the forward end of the divergent jet pipe 16 and the outside of the convergent nozzle 17. A valve member 19 forms a rotatable apertured sleeve around the jet pipe 16. When the apertures of the sleeve register with those of the jet pipe there is little restriction to the flow of by-pass air from the fan 13 through the duct 12 into the jet pipe 16, and in the other extreme position when the apertures are fully out of register the flow is fully cut off. Re-heat equipment 20 is mounted within the jet pipe 16 downstream of the rotary valve 19.

In the underside of the aircraft fuselage, in the wall of duct 12 aft of the fan 13, is an aperture 21 controlled by a valve consisting of a series of pivoted shutters 22 which in FIG. 4 are illustrated in the fully closed position. When in the open position the shutters form guide vanes to direct the by-pass air vertically downwards, as indicated by the arrows A, A. Operation of shutters 22 and valve 19 is effected by power means, such as a motor shown diagrammatically at 221 in FIG. 4.

The shutters 22 are interconnected one with another to act in unison, and their operation is arranged to be phased with the rotation of the valve 19, so that when the shutters 22 are fully closed the valve 19 is fully open, and vice-versa.

To save weight and to minimise frontal area, the outer wall 23 of the power plant, which constitutes the outer wall of the duct 12, may form part of the fuselage structure. The by-pass duct 12 has a restricted extension 121 leading to the tail of the aircraft, so that a thin shroud of relatively cool air is provided around the jet pipe in all conditions. Fuel is stored in the annular space 24 between the wall 23 and the outer contour of the fuselage. The wing spar box, which also can form a fuel tank, passes through the upper fuselage at 25.

In this particular embodiment the pitch setting of the blades of the fan 13 is controlled by the pilot by means of the control run 26. In operation, for very low speed "loitering" flight, say about 40 knots, the shutters 22 are in their efflux-deflecting position with the aperture 21 fully open. The valve 19 has been rotated until the apertures 18 are out of register and are fully closed. The greater part of the by-pass air from the fan 13 is, therefore, directed vertically downwards through aperture 21 giving substantial vertical lift. The central portion of the fan efflux passes into the turbo-jet engine 11, the exhaust from which passes through the jet pipe 16 to provide a measure of propulsive thrust. In this condition the jet pipe 16 is not completely filled by the engine exhaust so that it has a high degree of drag. This arrangement forms a useful air brake to enable the aircraft to maintain a slow flying speed. To aid control in this condition air may be bled from the compressor 111 of the engine 11 to provide flap blowing and/or puffer jet control nozzles (not shown) of known design.

For increased speed the aperture 21 will be closed by the shutters 22 and simultaneously the valve 19 will be rotated so that the apertures 18 are in register. The fan blade pitch setting is adjusted to give maximum mass flow, and because of the valve settings the greater part of the by-pass flow is directed into the jet pipe 16, giving maximum propulsive thrust. The jet pipe 16 will again run full so that the high drag associated with its former condition will be removed. Air used for flap blowing and puffer jet controls will be gradually withdrawn as the aircraft is able to rely more on normal aerodynamic controls with increase of speed.

It is calculated that the aircraft will be able to accelerate at about 1.5 G from level flight. The use of the re-heat equipment 20 will increase this acceleration substantially, but its use is left to the discretion of the pilot.

What I claim as my invention and desire to secure by Letters Patent is:

1. A jet-propelled aeroplane having a turbo-fan gas turbine power plant comprising a compressor fan, a compressor, a combustion zone and a turbine, said fan being driven from said turbine and a part of the air compressed by said fan by-passing the compressor, combustion zone and turbine, a duct for such by-pass air surrounding the power plant, a jet pipe receiving the efflux from the turbine, a valved aperture in the jet pipe connecting its interior with said by-pass duct, a second valved aperture in the by-pass duct with a downwardly directed orifice, and means for simultaneously closing said first valved aperture and opening said second valved aperture so that lift is obtained from by-pass air passing out of the downwardly directed orifice for low-speed flight, take-off or landing, and for simultaneously opening said first valved aperture and closing said second valved aperture so that by-pass air flows into the jet pipe to augment the forward thrust, characterized in that the compressor fan has variable pitch blades whereby the mass flow of by-pass air can be varied within wide limits, and the jet pipe is divergent whereby the said jet pipe can act as an air brake when by-pass air is passing out of the downwardly directed orifice and the jet pipe is only partly filled by the turbine efflux.

2. A jet-propelled aeroplane having a turbine power plant, comprising an air intake portion, a compressor, a combustion zone, a turbine, and a jet nozzle and a jet pipe for receiving the efflux from the turbine, said nozzle being positioned between at least a portion of said jet pipe and said turbine, means for diverting a portion of the air entering said air intake portion from said compressor, combustion zone and turbine, and directing it vertically downwardly from said jet-propelled aeroplane to provide direct lift, said jet nozzle being convergent in form and said jet pipe being substantially divergent in form, whereby when the efflux passing through said jet pipe is small, the efflux does not completely fill the jet pipe and thereby develops a high degree of drag.

3. A jet-propelled aeroplane as defined in claim 2, further comprising means for simultaneously closing the first valved aperture and opening the second valved aperture.

4. A jet-propelled aeroplane having a turbine power plant comprising an air intake portion, a compressor, a combustion zone, a turbine, a compressor fan positioned externally of said compressor and between said air intake portion and said compressor for driving a portion of said intake air to by-pass said compressor, combustion zone and turbine, a jet pipe and a jet nozzle for receiving the efflux from said turbine wherein said jet nozzle is positioned between at least a portion of said jet pipe and said turbine, said nozzle being convergent in form and said jet pipe being divergent in form, said jet pipe having a first valved aperture therein, and an air duct surrounding at least a portion of said power plant and extending substantially from said compressor fan to said jet pipe, said first aperture connecting the interior of said jet pipe to said air duct, a second valved aperture in said by-pass duct with a downwardly directed orifice, said by-pass air passing through said air duct.

5. A jet-propelled aeroplane as defined in claim 4, wherein said compressor fan is a variable pitch fan.

6. A jet-propelled aeroplane as defined in claim 4, wherein said fan diameter is greater than said compressor diameter.

References Cited

UNITED STATES PATENTS

| 3,053,482 | 9/1962 | Matthews et al. | 244—23 |
| 3,174,707 | 3/1965 | Ricard | 244—12 |
| 3,266,243 | 8/1966 | Thomas. | |

FOREIGN PATENTS

| 244,980 | 6/1947 | Switzerland. |

MILTON BUCHLER, Primary Examiner

J. E. PITTENGER, Assistant Examiner

U.S. Cl. X.R.
60—226; 244—12